(12) United States Patent
Seki et al.

(10) Patent No.: US 10,542,166 B2
(45) Date of Patent: Jan. 21, 2020

(54) IMAGE READING APPARATUS AND DOCUMENT SIZE DETECTING METHOD

(71) Applicant: CANON KABUSHIKI KAISHA, Tokyo (JP)

(72) Inventors: Satoshi Seki, Tokyo (JP); Akiko Kanno, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/968,394

(22) Filed: May 1, 2018

(65) Prior Publication Data

US 2018/0332183 A1 Nov. 15, 2018

(30) Foreign Application Priority Data

May 10, 2017 (JP) .................................. 2017-093677

(51) Int. Cl.
*H04N 1/00* (2006.01)
*H04N 1/407* (2006.01)

(52) U.S. Cl.
CPC ..... *H04N 1/00745* (2013.01); *H04N 1/00551* (2013.01); *H04N 1/00814* (2013.01); *H04N 1/00816* (2013.01); *H04N 1/00835* (2013.01); *H04N 1/00997* (2013.01); *H04N 1/4076* (2013.01)

(58) Field of Classification Search
CPC .................................................. H04N 1/00745
See application file for complete search history.

(56) References Cited

U.S. PATENT DOCUMENTS

| 6,657,748 B1* | 12/2003 | Okita ..................... H04N 1/401 358/461 |
| 8,134,753 B2* | 3/2012 | Ishido ................ H04N 1/00551 358/449 |
| 2006/0193013 A1* | 8/2006 | Hoshi ................ H04N 1/00708 358/474 |
| 2010/0073739 A1 | 3/2010 | Sekiguchi et al. ............ 358/474 |
| 2010/0128331 A1 | 5/2010 | Hamano et al. .............. 358/505 |
| 2017/0214816 A1 | 7/2017 | Yamakawa et al. ..... H04N 1/04 |

FOREIGN PATENT DOCUMENTS

JP 2004-258386 9/2004

* cited by examiner

*Primary Examiner* — King Y Poon
*Assistant Examiner* — Michael Burleson
(74) *Attorney, Agent, or Firm* — Venable LLP

(57) ABSTRACT

An image reading apparatus including a controller configured to perform an update processing for updating shading correction data stored in a memory by a generation processing of generating shading correction data based on an image signal of a reference member and perform a size determination processing for determining a size of a document based on an image signal of the document, wherein, when the document on the document platen is read, the controller performs the generation processing before the document is read, and an image processing portion performs the shading correction using the shading correction data generated before the document is read, and wherein, when the size determination processing is performed, the image processing portion performs the shading correction using the shading correction data stored in the memory, and the update processing is not performed.

6 Claims, 17 Drawing Sheets

IMAGE READING APPARATUS AND DOCUMENT SIZE DETECTING METHOD

BACKGROUND OF THE INVENTION

Field of the Invention

The present invention relates to an image reading apparatus, which reads an image formed on a document (hereinafter referred to as a "document image") and a document size detecting method.

Description of the Related Art

An image reading apparatus is often incorporated in a copier or a multifunction product. The image reading apparatus can perform document size detection, which automatically determines the size of a document placed on a document platen glass when a document platen cover is closed. Document size detection can be performed in many ways. For example, the length of the document in the sub-scanning direction (sub-scanning direction length) is detected by a document presence/absence sensor configured to detect whether there is a document on the document platen glass or not. The length of the document in the main-scanning direction (main-scanning direction length) is detected by a document size detector disclosed in U.S. Pat. No. 8,134,753, for example. The document size detector optically reads an image of the document at two open/closed angles (about 20° and about 5°) of the document platen cover and determines the main-scanning direction length of the document by detecting the white/black contrast of each read result.

In detection of the main-scanning direction length, light is emitted to read the document image. Since light is emitted when the document platen cover is in the open state (at open/closed angles of about 20° and about 5°), the light reaches the eyes of the user, and the user may suffer from the bright light. To avoid this, the document size is desirably detected from the document image read with the original platen cover in the closed state. Since both the back side of the document platen cover and the document are often white in color, a shading correction is performed when the document image is read. The shading correction allows precise detection of document edges from the read document image and therefore allows precise detection of the document size. Shading data used for the shading correction is generated by reading a white reference plate when the document platen cover in the open state is closed, for example. When the white reference plate is read, light is also emitted, and the user may suffer from the bright light.

SUMMARY OF THE INVENTION

The present invention has been made in view of the problems described above. The present invention provides an image reading apparatus configured to generate shading data used for detection of a document size in such a manner that a user does not suffer from bright light.

According to an embodiment of the present invention, an image reading apparatus, comprising:
  a document platen on which a document to be read is placed;
  a reference member;
  a document platen cover, which is openably and closably attached to the document platen;
  a detector configured to detect an open state and a closed state of the document platen cover;
  a reader configured to read the document on the document platen while moving a reading position to output an image signal;
  an illuminator configured to illuminate the reading position;
  a memory configured to store shading correction data;
  an image processing portion configured to perform a shading correction on the image signal using the shading correction data; and
  a controller, which is configured to:
  perform an update processing in which the controller makes the reader read the reference member, performs a generation processing of generating shading correction data based on the image signal of the reference member output from the reader, and updates the shading correction data stored in the memory using the generated shading correction data, and
  perform a size determination processing in which the controller moves the reading position to a first position based on that a detection result of the detector is in a first state, then moves the reading position from the first position to a second position while lighting up the illuminator based on that the detection result of the detector is in a second state, and determines a size of the document based on a result of the shading correction performed on the image signal output from the reader while the reading position is being moved from the first position to the second position,
  wherein, when the document on the document platen is read, the controller performs the generation processing before the document is read, and the image processing portion performs the shading correction using the shading correction data generated before the document is read, and
  wherein, when the size determination processing is performed, the image processing portion performs the shading correction using the shading correction data stored in the memory, and the update processing is not performed during a period from a time when the detection result falls into the first state to a time when the reading position becomes the second position.

Further features of the present invention will become apparent from the following description of exemplary embodiments with reference to the attached drawings.

DESCRIPTION OF THE EMBODIMENTS

The embodiments will be described in detail with reference to the accompanying drawings.

(General Configuration)

Figure 1:
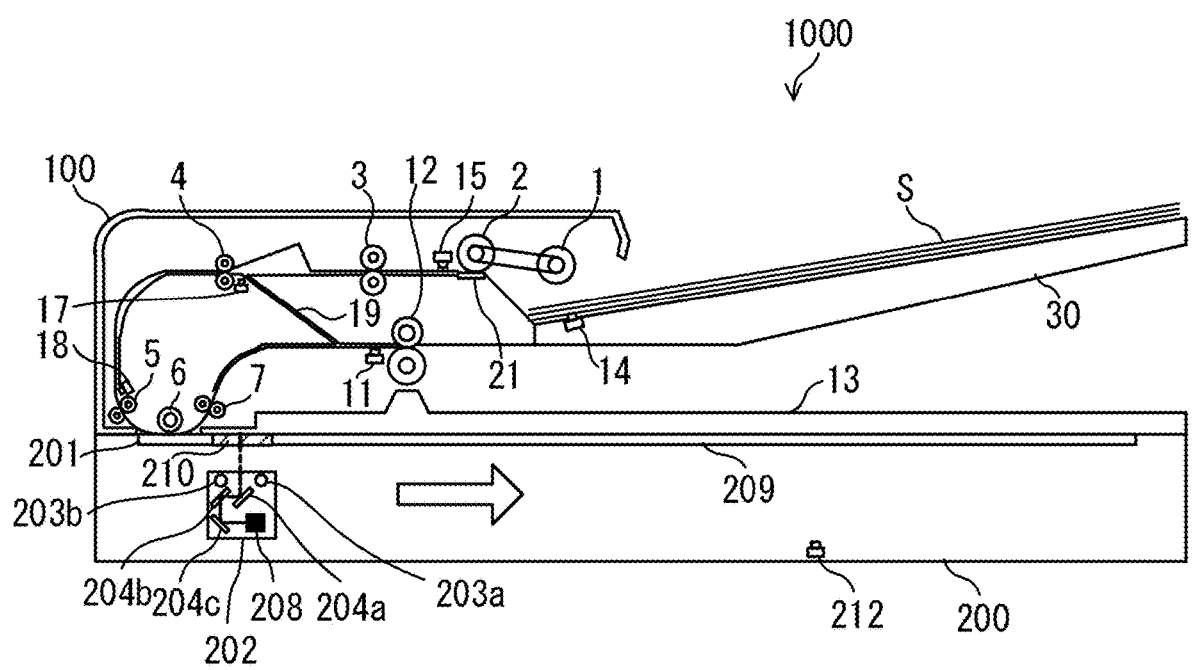
FIG. 1 is a diagram illustrating a configuration of an image reading apparatus.

FIG. 1 is a diagram illustrating a configuration of an image reading apparatus according to an embodiment. The image reading apparatus 1000 includes an automatic document feeder (abbreviated as ADF, hereinafter) 100 and an image reading portion 200 configured to read a document image. The image reading portion 200 includes an optical scanner unit 202, which is a reading unit that optically reads a document image of a document S. The image reading apparatus 1000 includes a control unit 150 (see FIG. 2) that controls the operation of the portions involved in an image reading processing and performs an image processing on the read document image to generate image data.

The ADF 100 is adapted to be openable and closable with respect to the image reading portion 200. The image reading portion 200 includes a flow reading glass 201, a white reference plate 210 and a platen glass 209, which are provided on the side toward the ADF 100 and are flush with each other. The ADF 100 can successively feed a plurality of documents S to a reading position in the image reading portion 200. The document fed by the ADF 100 is read by the image reading portion 200 on the flow reading glass 201, which is the reading position. This operation is referred to as "flow reading". The image reading portion 200 can also read a document placed on the document platen glass 209. This operation is referred to as "fixed reading". In the case of the fixed reading, the ADF 100 functions as a document platen cover that is opened and closed with respect to the image reading portion 200.

(Configuration of ADF)

The ADF 100 includes a document tray 30 on which a batch of documents, which includes one or more documents S, is placed. A document presence/absence sensor 14 is provided on the document tray 30 at a position close to a base end thereof. The document presence/absence sensor 14 detects the presence or absence of a document S on the document tray 30. Up to 100 sheets of plain paper can be placed on the document tray 30, for example. From the batch of documents placed on the document tray 30, one document S is conveyed at a time to the reading position in the image reading portion 200 by the ADF 100. To convey the document S to the reading position, a conveyance path includes a feed roller 1, a separation roller 2 and a separation pad 21 downstream of the feed roller 1, a draw roller 3 downstream of the separation roller 2 and the separation pad 21, a registration roller 4 downstream of the draw roller 3 and an upstream read roller 5 downstream of the registration roller 4.

The feed roller 1 is provided at a position close to the base end of the document tray 30. The feed roller 1 rests on and rotates on a surface of a document of the batch of documents placed on the document tray 30 on which an image to be read is formed. As a result, feeding of the document S at the top of the batch of documents is started. The separation pad 21 and the separation roller 2 separate one document from the documents S fed by the feed roller 1. The separation processing is achieved in a well-known separation technique. The feed roller 1, the separation roller 2 and the separation pad 21 prevents the batch of documents from projecting from the document tray 30 to the downstream side in the conveyance direction before feeding of the documents S is started.

The draw roller 3 conveys the document S separated by the separation roller 2 and the separation pad 21 to the registration roller 4. The draw roller 3 makes the document S abut against the registration roller 4. When the document S abuts against the registration roller 4, the document S bends in a loop-like shape, and any skew of the document being conveyed is eliminated. The upstream read roller 5 conveys the document S conveyed by the registration roller 4 to the reading position. The reading position is defined by the flow reading glass 201 and a read roller 6. In the flow reading, the document image is read by the optical scanner unit 202 when the document S is being conveyed between the flow reading glass 201 and the read roller 6.

On the downstream side of the reading position in the conveyance direction, the conveyance path includes a downstream read roller 7 and a discharge roller 12, which are provided in succession. The document S which has passed through the reading position and whose document image has been read by the optical scanner unit 202 is conveyed to the discharge roller 12 by the downstream read roller 7. The discharge roller 12 discharges the conveyed document S into a discharge tray 13. An inversion path 19 is provided between the downstream read roller 7 and the discharge roller 12. The inversion path 19 is used when a document image of a document S that has images formed on both surfaces is read, for example. The document S is inverted in the inversion path 19 before being conveyed to the registration roller 4. The document S conveyed to the registration roller 4 is fed to the reading position again, and the document image on the opposite surface of the document is read.

The conveyance path includes a separation sensor 15, a registration sensor 17 downstream of the separation sensor 15, a read sensor 18 downstream of the registration sensor 17, and a discharge sensor 11 downstream of the read sensor 18. The separation sensor 15 detects the document S fed by the feed roller 1 and the separation roller 2. The registration sensor 17 is provided upstream of the registration roller 4 in the conveyance direction and detects the document S conveyed. Based on the detection result of the registration sensor 17, driving of the registration roller 4 is controlled. The read sensor 18 is provided upstream of the upstream read roller 5 in the conveyance direction and detects the document S conveyed. Based on the detection result of the read sensor 18, driving of the upstream read roller 5 and the read roller 6 is controlled, and a reading operation of the optical scanner unit 202 is controlled. The discharge sensor 11 is provided upstream of the discharge roller 12 in the conveyance direction and detects the document S conveyed. Based on the detection result of the discharge sensor 11, driving of the discharge roller 12 is controlled.

When an image to be read is formed on only one surface of the document S, the document S is conveyed from the document tray 30 along the conveyance path and discharged into the discharge tray 13. When images to be read are formed on both surfaces of the document S, the document S is first conveyed in the same manner as in the case where the image to be read is formed on only one surface, and the document image on one surface is read. After that, the document S is conveyed toward the discharge tray 13 by the downstream read roller 7 and the discharge roller 12. Once a trailing end (an upstream end in the conveyance direction) of the document S has passed by the discharge sensor 11, the discharge roller 12 stops. Thus, the document S stops moving before completely passing through the discharge roller 12. The discharge roller 12 then rotates in the inverse direction, and the document S is conveyed to the registration roller 4 through the inversion path 19. In this way, the document S is inverted. The inverted document S is conveyed from the registration roller 4 to the reading position, and the document image on the opposite surface is read. The document S is then conveyed to the registration roller 4 through the inversion path 19 again, and discharged without any document image being read. Thus, all the documents S are discharged into the discharge tray 13 in the same order as when the documents S are placed in the document tray 30.

(Image Reading Portion)

In the flow reading and the fixed reading, the optical scanner unit (reader) 202 of the image reading portion 200 reads the document image in a direction perpendicular to the sheet of FIG. 1, which is a main scanning direction. In the fixed reading, the optical scanner unit 202 reads a predetermined number of lines (one line, for example) of the document image by moving at a constant speed in a sub-scanning direction (the direction indicated by an arrow in FIG. 1) perpendicular to the main scanning direction to move the reading position. In the flow reading, the optical scanner unit 202 is positioned to be opposed to a central position of the read roller 6 with the flow reading glass 201 interposed therebetween and reads a predetermined number of lines (one line, for example) of the document image of the document S being conveyed.

The optical scanner unit 202 includes light emitting diodes (LEDs) 203a and 203b, which serve as a light source (light emitting portion), a plurality of mirrors 204a to 204c and an image reading sensor 208, which serves as a light receiving portion. The LEDs 203a and 203b emit light to a surface of the document S on which an image is formed. Reflection light from the document S is guided to the image reading sensor 208 by the mirrors 204a to 204c. The image reading sensor 208 receives the reflection light, converts the reflection light into an electrical signal, and inputs the electrical signal to the control unit 150. The control unit 150 generates image data based on the input electrical signal.

Alternatively, the image reading sensor 208 may be fixed at a predetermined position, and the light sources and the plurality of mirrors may be moved in the sub-scanning direction to move the reading position.

The image reading portion 200 further includes a sub-scanning direction length detector 212 configured to detect the presence or absence of the document S placed on the document platen glass 209. The sub-scanning direction length detector 212 is disposed at a position where the sub-scanning direction length detector 212 can detect the presence or absence of the document S on the document platen glass 209 at a predetermined position in the sub-scanning direction in order to detect the sub-scanning direction length, which is the length of the document S placed on the document platen glass 209 in the sub-scanning direction.

(Control Unit)

Figure 2:
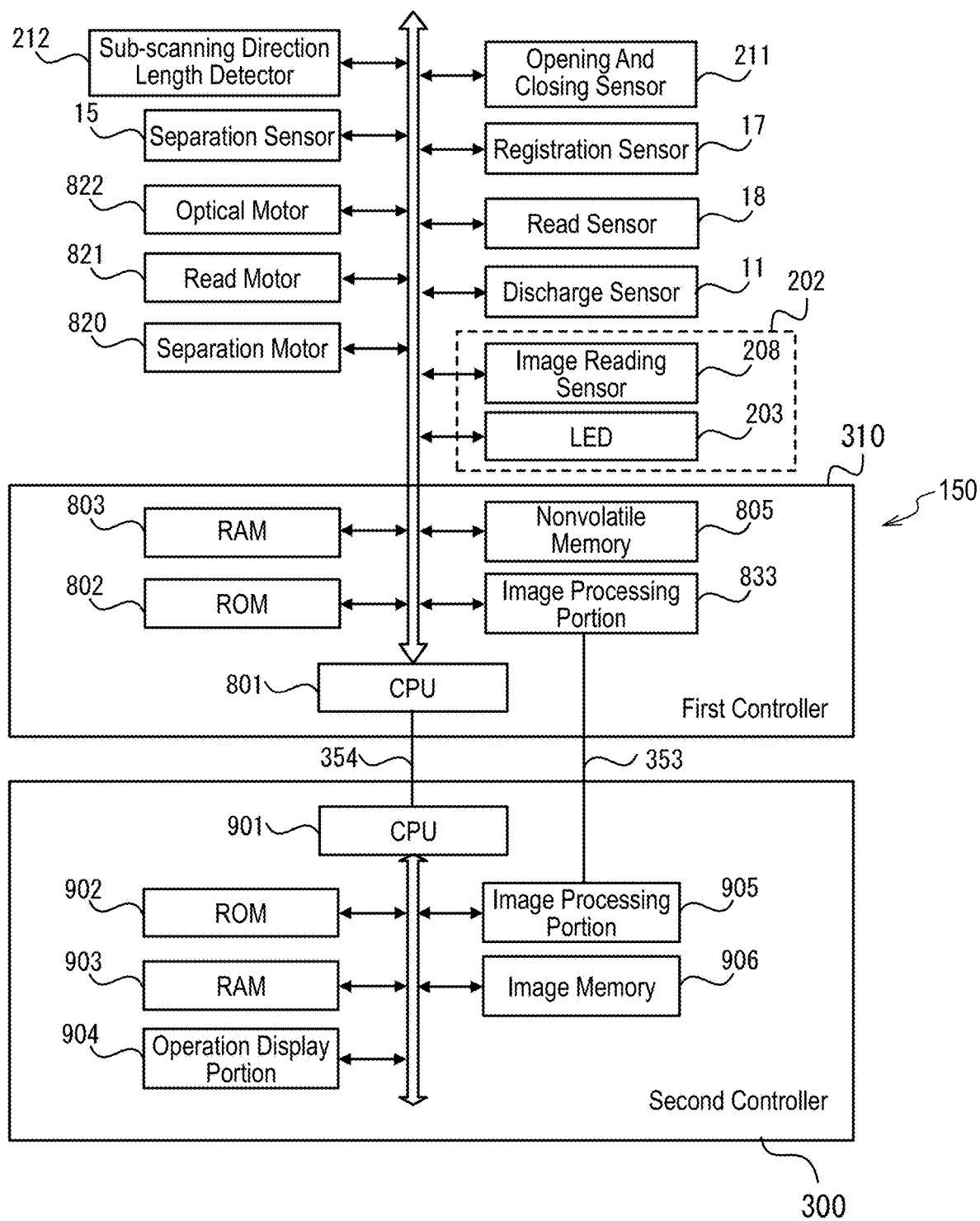
FIG. 2 is a diagram illustrating a configuration of a control unit.

FIG. 2 is a diagram illustrating a configuration of the control unit 150 that controls the operation of the image reading apparatus 1000. The control unit 150 in this embodiment is formed by a first controller 310 and a second controller 300, which may be integrated with each other. The first controller 310 mainly performs control of the ADF 100 and the optical scanner unit 202, and the second controller 300 mainly performs an image data generation processing.

The first controller 310 is a computer system that includes a central processing unit (CPU) 801, a read only memory (ROM) 802 and a random access memory (RAM) 803. The first controller 310 further includes an image processing portion 833 and a nonvolatile memory 805. The CPU 801 reads a control program stored in the ROM 802 and executes the control program by using the RAM 803 as a working area, thereby controlling the operation of the portions of the ADF 100 and the optical scanner unit 202. The nonvolatile memory 805 stores various kinds of data required for the processing.

A separation motor 820 and a read motor 821 for conveying the document S are connected to the CPU 801. The separation motor 820 controls rotation of the feed roller 1, the separation roller 2, the draw roller 3 and the registration roller 4 under the control of the CPU 801. The CPU 801 makes the separation motor 820 rotate in the forward direction to make the feed roller 1, the separation roller 2, the draw roller 3 and the registration roller 4 rotate to convey the document S to the downstream side in the conveyance direction. The read motor 821 controls rotation of the upstream read roller 5, the read roller 6, the downstream read roller 7 and the discharge roller 12 under the control of the CPU 801. The CPU 801 makes the read motor 821 rotate in the forward direction to make the upstream read roller 5, the read roller 6, the downstream read roller 7 and the discharge roller 12 rotate to convey the document S to the downstream side in the conveyance direction. When the document S is to be conveyed to the inversion path 19, the CPU 801 makes the read motor 821 rotate in the reverse direction to make the discharge roller 12 rotate.

The CPU 801 receives detection results from the separation sensor 15, the registration sensor 17, the read sensor 18 and the discharge sensor 11 provided in the ADF 100, and controls the motors in response to the detection results from the sensors to perform a document conveyance control. For example, the separation motor 820 and the read motor 821 are pulse motors. The CPU 801 controls the number of drive pulses of each motor, monitors the position of the document S being conveyed by associating the number of drive pulses of each motor with the detection result of the corresponding sensor, and controls each motor based on the monitoring result.

An optical motor 822 is connected to the CPU 801. The optical motor 822 moves the optical scanner unit 202 in the sub-scanning direction under the control of the CPU 801. The optical scanner unit 202 is provided on a rail (not shown) that extends in the sub-scanning direction, for example, and is moved by the optical motor 822 in the sub-scanning direction along the rail. In reading of the document image, the CPU 801 controls the position of the optical scanner unit 202 by the action of the optical motor 822. For example, in the fixed reading, the optical scanner unit 202 reads the document placed on the document platen glass 209 while moving in the sub-scanning direction.

The CPU 801 controls the operation of the LED 203 and the image reading sensor 208 for reading the document image. The LED 203 emits light under the control of the CPU 801. The image reading sensor 208 inputs an electrical signal that is based on received reflection light to the CPU 801. The CPU 801 makes the image processing portion 833 transmit the received electrical signal to the second controller 300 via an image line 353. In addition, the CPU 801 communicates a vertical synchronization signal, which serves as a reference for a leading end of the document image, a horizontal synchronization signal, which serves as a reference for a leading pixel of a line, to the second controller 300 via a communication line 354.

Figure 3:
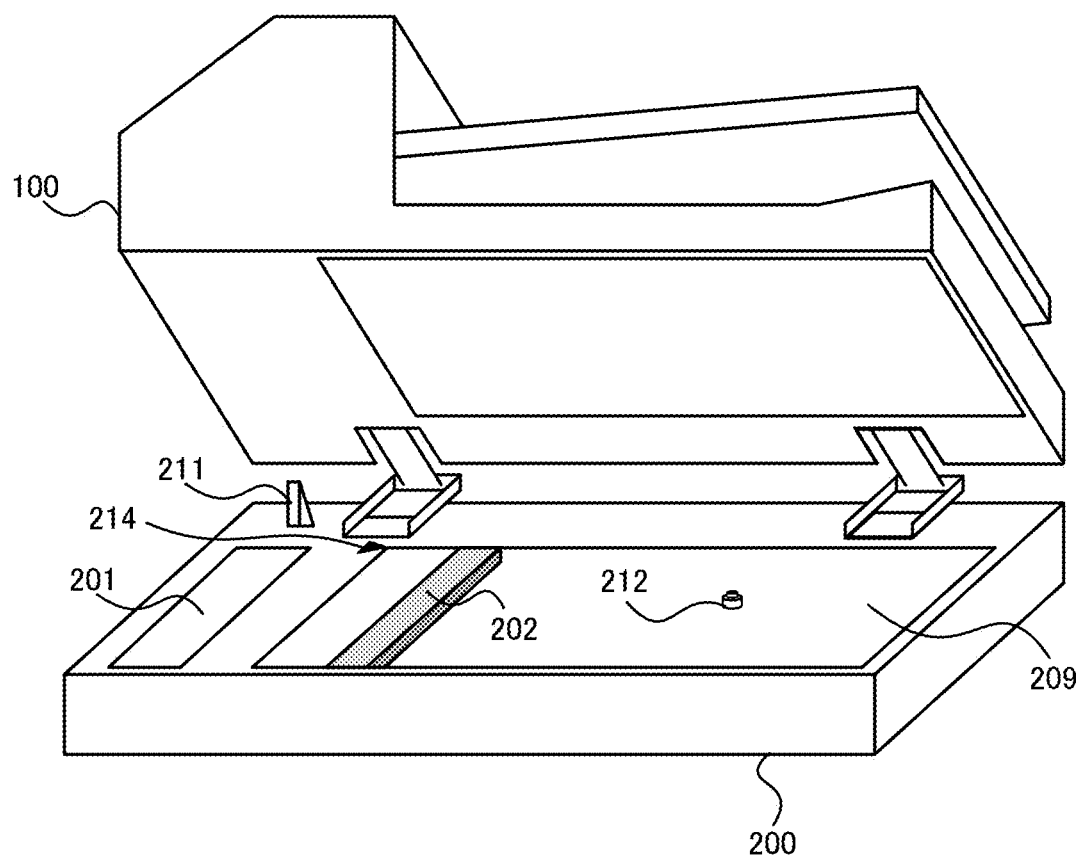
FIG. 3 is a perspective view of the image reading apparatus with an ADF in an open state.

An opening and closing sensor 211 configured to detect opening and closing of the ADF 100 is connected to the CPU 801. FIG. 3 is a perspective view of the image reading apparatus 1000 with the ADF 100 in an open state. The opening and closing sensor 211 is a flag-type sensor that operates in response to opening and closing of the ADF 100. The opening and closing sensor 211 detects that the ADF 100 is in the open state when the ADF 100 is opened with respect to the image reading portion 200 (document platen glass 209) to an angle of 1° or larger, for example.

To detect the sub-scanning direction length of the document S placed on the document platen glass 209, a sub-scanning direction length detector 212 is connected to the CPU 801. The CPU 801 checks the presence or absence of the document S at a predetermined position on the document platen glass 209 based on the detection result of the sub-scanning direction length detector 212, thereby determining whether the document S extends beyond the predetermined position in the sub-scanning direction. As shown in FIG. 3, the document platen glass 209 has an abutment position 214 at a corner thereof. The abutment position 214 is a reference position for the document S to be placed. The abutment position 214 is also a reference position for the document size to be detected, and the main scanning direction length and the sub-scanning direction length of the document S are detected as distances from the abutment position 214. The sub-scanning direction length detector 212 is provided at a predetermined distance from the abutment position 214 in the sub-scanning direction. The CPU 801 determines the sub-scanning direction length of the document S based on whether it is larger than the distance from the abutment position 214 to the position of the sub-scanning direction length detector 212 or not.

The second controller 300 is a computer system that includes a CPU 901, a ROM 902 and a RAM 903. The CPU 901 reads a control program stored in the ROM 902 and executes the control program by using the RAM 903 as a working area, thereby performing the image data generation processing. The CPU 901 generates image data representing the read document image from the signals received from the CPU 801 via the communication line 354 and the electrical signal received by the image processing portion 905 via the image line 353. The CPU 901 stores the generated image data in an image memory 906.

An operation display portion 904 is connected to the second controller 300. The operation display portion 904 is a user interface. Instructions from a user, such as an instruction to read the document image, are input to the CPU 901 via the operation display portion 904. The CPU 901 makes the operation display portion 904 display a screen to help the user to input instructions. Alternatively, the CPUs 801 and 901 may be a single physically integrated CPU, and the communication between the CPUs 801 and 901 may be a task-to-task communication.

(Initial Adjustment Processing)

Figure 4:
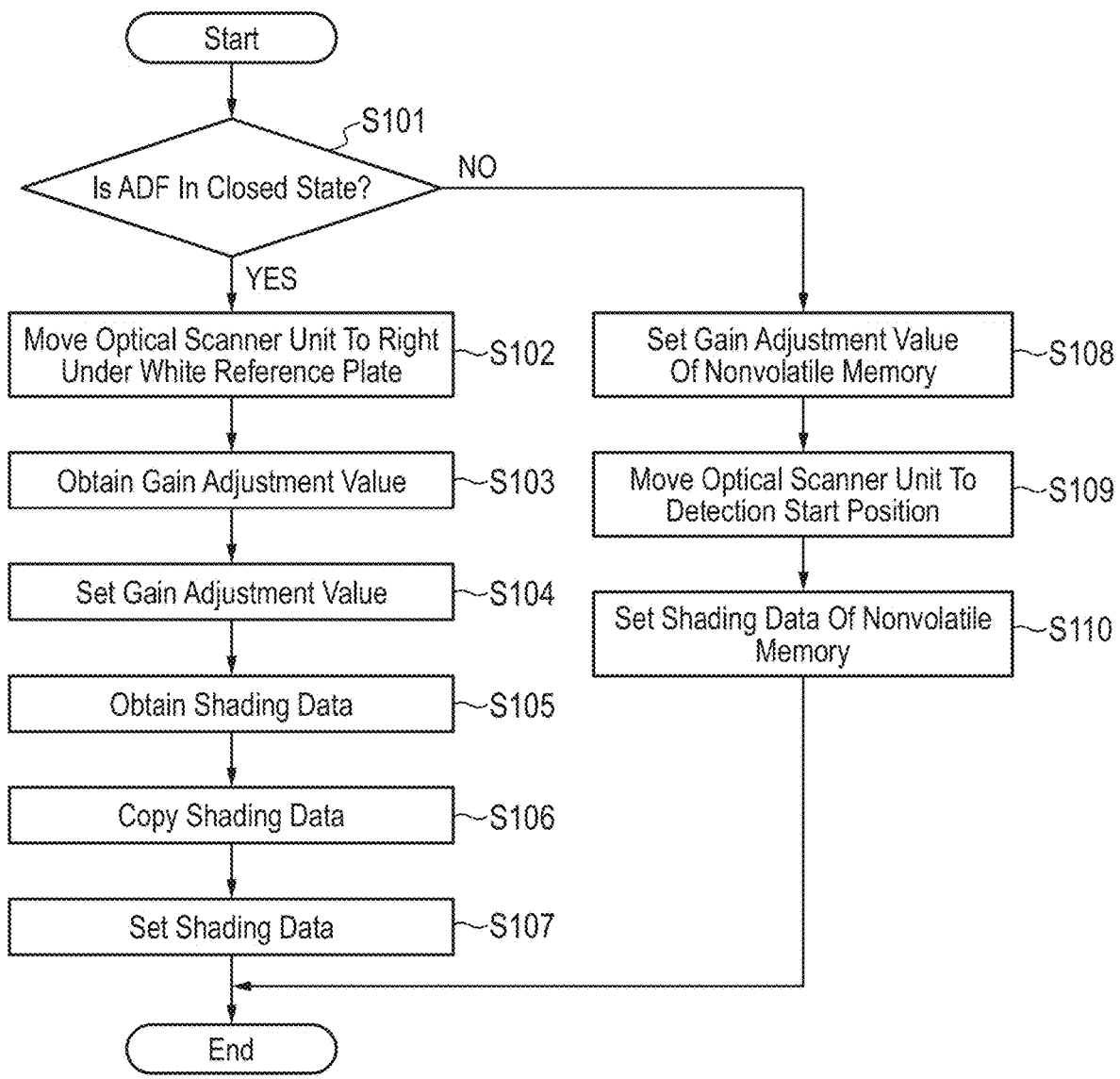
FIG. 4 is a flowchart illustrating an initial adjustment processing.
Figure 5A:
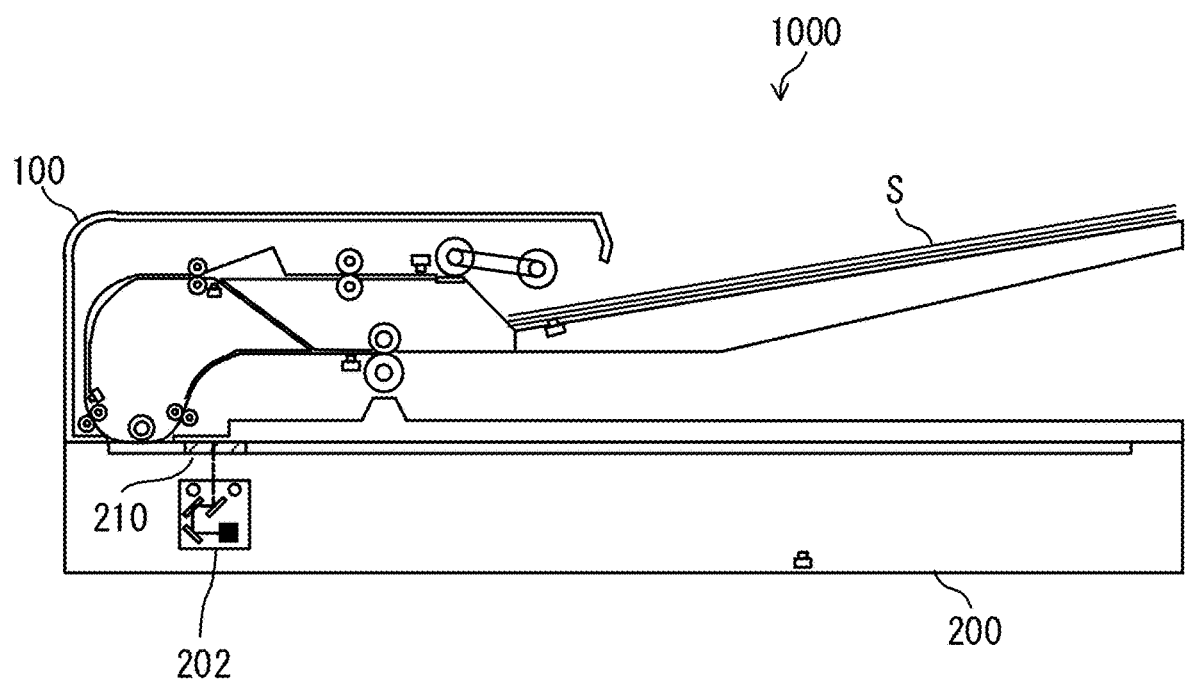
FIGS. 5A and 5B are diagrams for illustrating positions of an optical scanner unit in the initial adjustment processing.
Figure 5B:
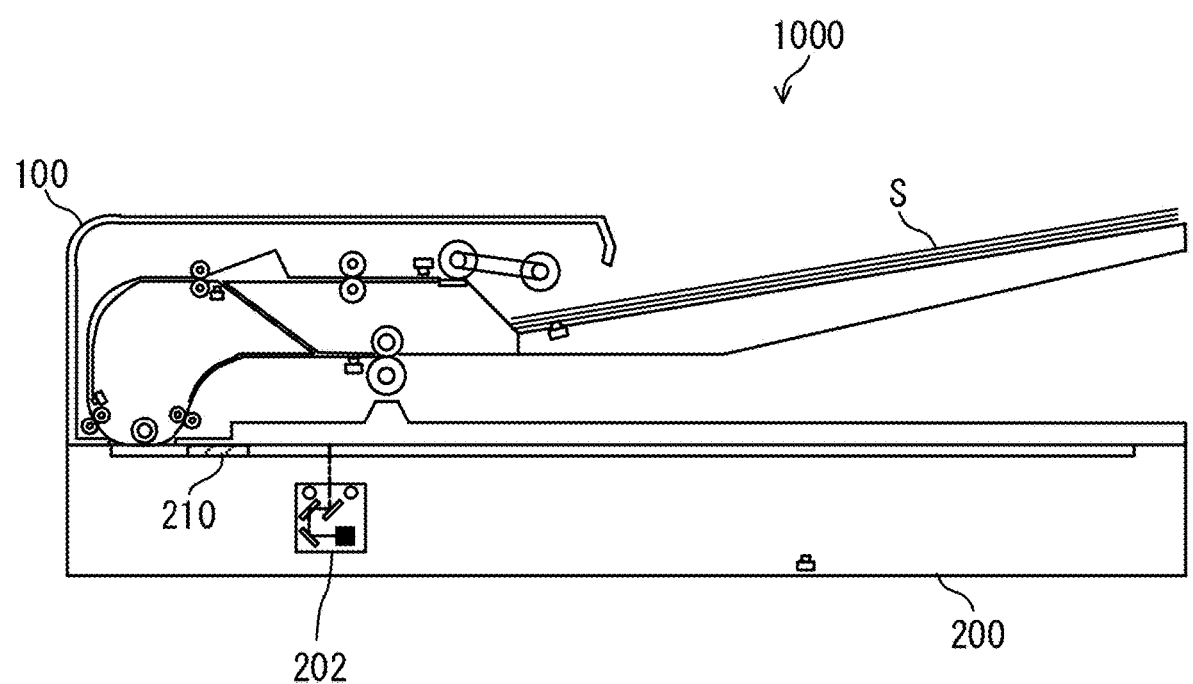

An initial adjustment processing of the image reading apparatus 1000 will be described. FIG. 4 is a flowchart illustrating the initial adjustment processing of the image reading apparatus 1000. The initial adjustment processing is a setting processing for document size detection performed when the image reading apparatus 1000 is powered on or restored from a sleep state. FIGS. 5A and 5B are diagrams for illustrating the position of the optical scanner unit 202 in the initial adjustment processing. In this embodiment, when the document is read for document size detection, predetermined reading conditions are adopted. The predetermined reading conditions are a resolution of 600 dots per inch(dpi), color reading, and fixed reading, for example.

Upon starting the initial adjustment processing in response to power-on or an instruction to restore from the sleep state, the CPU 801 determines whether the ADF 100 is in the open state or a closed state based on the detection result of the opening and closing sensor 211 (S101). If the ADF 100 is in the closed state (that is, if YES in S101), the CPU 801 makes the optical motor 822 move the optical scanner unit 202 to right under the white reference plate 210 as shown in FIG. 5A (S102). Once the optical scanner unit 202 is moved to right under the white reference plate 210, the CPU 801 makes the optical scanner unit 202 read the white reference plate 210 under the predetermined reading conditions.

Figure 6:
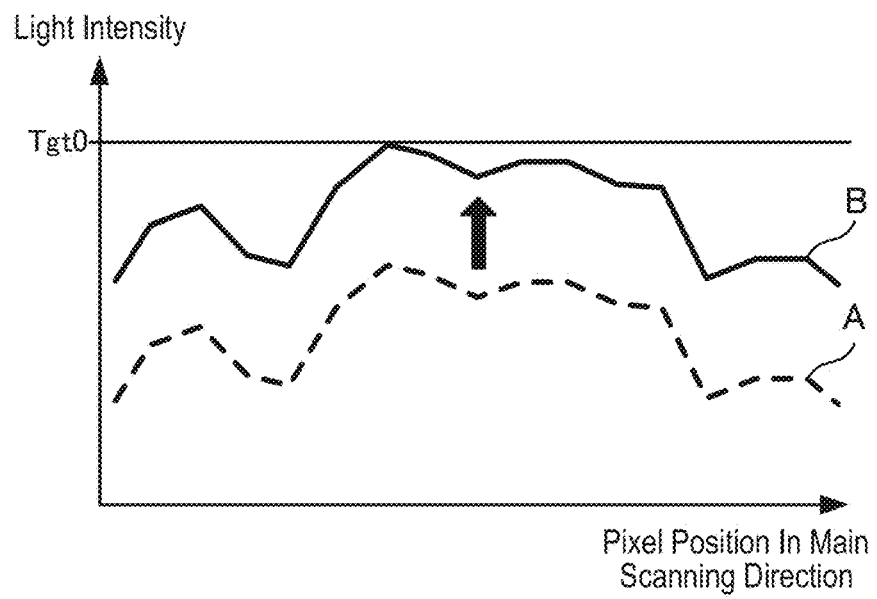
FIG. 6 is a graph for illustrating a gain adjustment value.

The CPU 801 obtains the read result on the white reference plate 210 from the optical scanner unit 202, and obtains a gain adjustment value responsive to the read result (S103). The "gain adjustment value" is a value used to amplify a maximum value of an electrical signal that is a result of reading of a line by the optical scanner unit 202 to a target value Tgt0. An amplifier that amplifies the read result of the optical scanner unit 202 is provided in one of the CPU 801 and the image processing portion 833 or provided as a portion separate therefrom. FIG. 6 is a graph for illustrating the gain adjustment value. A dotted line A indicates an unamplified result of reading of a line of pixels (in the main scanning direction) by the optical scanner unit 202. The read result corresponds to the intensity of the light received by the image reading sensor 208. The CPU 801 calculates the gain adjustment value that amplifies the read result indicated by the dotted line A to the level indicated by a solid line B. The CPU 801 sets the calculated gain adjustment value in the image processing portion 833 to reflect the calculation result in the subsequent document image reading (S104). The image processing portion 833 amplifies an electrical signal that corresponds to the read light intensity (the intensity of the light received by the image reading sensor 208) with the set gain adjustment value to generate an electrical signal that corresponds to the light intensity indicated by the solid line B in FIG. 6, and transmits the electrical signal to the image processing portion 905.

Figure 7:
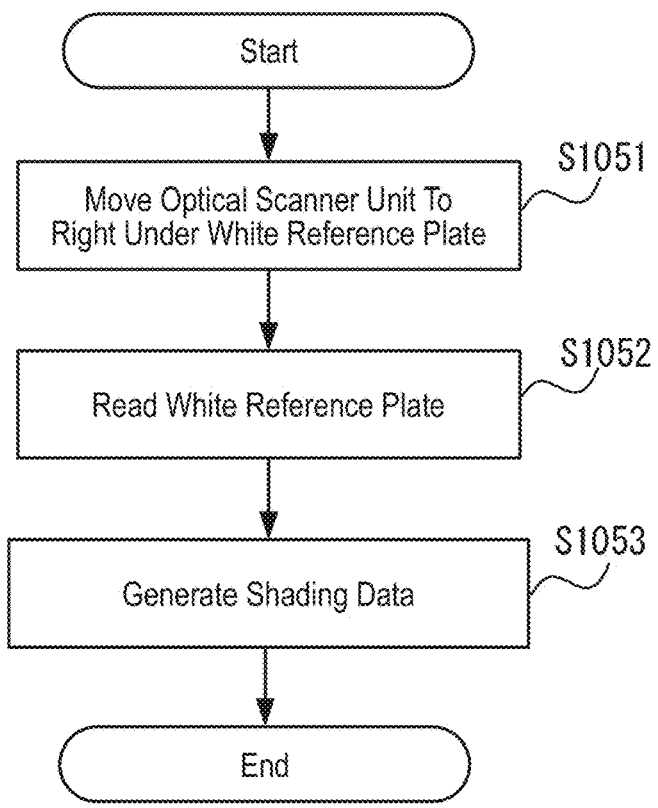
FIG. 7 is a flowchart for illustrating a shading data generation processing.
Figure 8:
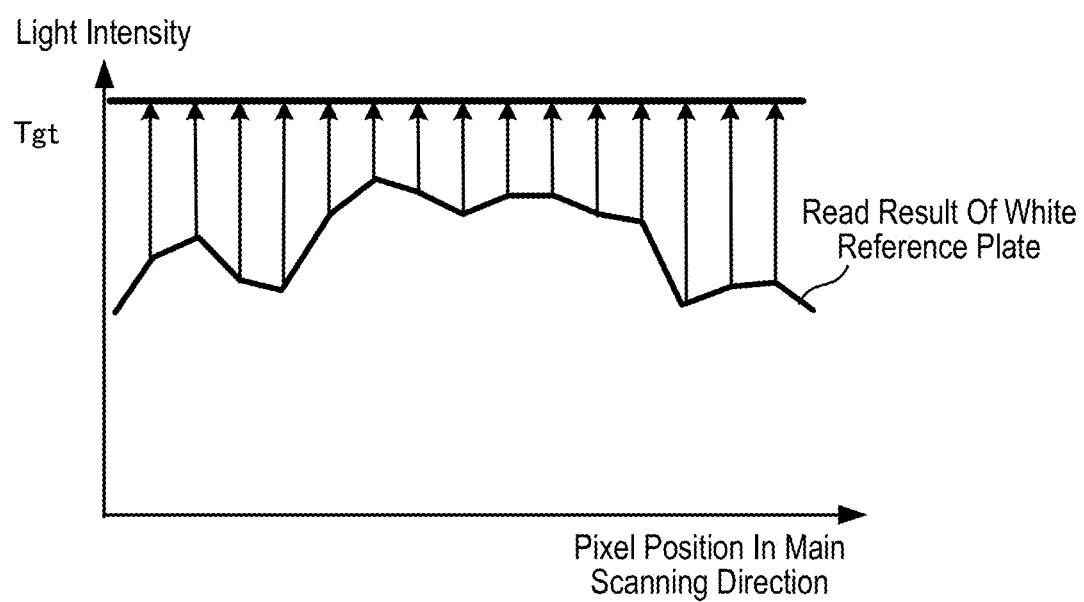
FIG. 8 is a graph for illustrating shading data.

After setting the gain adjustment value, the CPU 801 reads the white reference plate 210 again to obtain shading data for document size detection responsive to the read result (S105). FIG. 7 is a flowchart illustrating a shading data generation processing. Upon starting the shading data generation processing, the CPU 801 first makes the optical motor 822 move the optical scanner unit 202 to right under the white reference plate 210 (S1051). In the initial adjustment processing, the optical scanner unit 202 has already been moved to right under the white reference plate 210 in S102, and therefore, this step is unnecessary. Under the control of the CPU 801, the optical scanner unit 202 reads the white reference plate 210 (S1052). The CPU 801 obtains the read result on the white reference plate 210 from the optical scanner unit 202, and generates shading data based on the read result (S1053). FIG. 8 is a graph for illustrating the shading data. The generation of the shading data is performed by calculating a gain that adjusts the light intensity of the LED 203 configured to emit light to each pixel in the main scanning direction to amplify the light intensity at each pixel in a line (in the main scanning direction) to a target value Tgt. The target value Tgt is previously determined depending on the job to be performed. That is, the shading data is correction data used to correct the light intensity at each pixel of a line in reading of the white reference plate 210 to the target value Tgt.

The CPU 801 copies the generated shading data into a shading data storage area in the RAM 803 (S106). The CPU 801 sets the obtained shading data in the image processing portion 833 for the document size detection processing (S107).

If the ADF 100 is in the open state (that is, if NO in S101), the CPU 801 reads the gain adjustment value from the nonvolatile memory 805 and sets the gain adjustment value in the image processing portion 833 (S108). In response to the set gain adjustment value, the image processing portion 833 amplifies the read result. The CPU 801 makes the optical motor 822 move the optical scanner unit 202 to a document size detection starting position shown in FIG. 5B (S109). Once the optical scanner unit 202 is moved to the detection starting position, the CPU 801 reads the shading data from the nonvolatile memory 805 and sets the shading data in the image processing portion 833 (S110).

The initial adjustment processing ends with the setting of the gain adjustment value and the shading data in the image processing portion 833 described above. Then, the image processing portion 833 can perform a document size detection processing. When the image reading apparatus 1000 is powered off or shifts to the sleep state, the CPU 801 copies the gain adjustment value set in the image processing portion 833 and the shading data stored in the shading data storage area in the RAM 803 into the nonvolatile memory 805. In the next initial adjustment, if the ADF 100 is in the open state, the gain adjustment value and the shading data in the nonvolatile memory 805 are set in the image processing portion 833 in S108 and S110. Thus, compared with the case where the gain adjustment value and the shading data are not copied, newer gain adjustment value and shading data can be used for the document size detection.

(Document Size Detection Processing)

Figure 9:
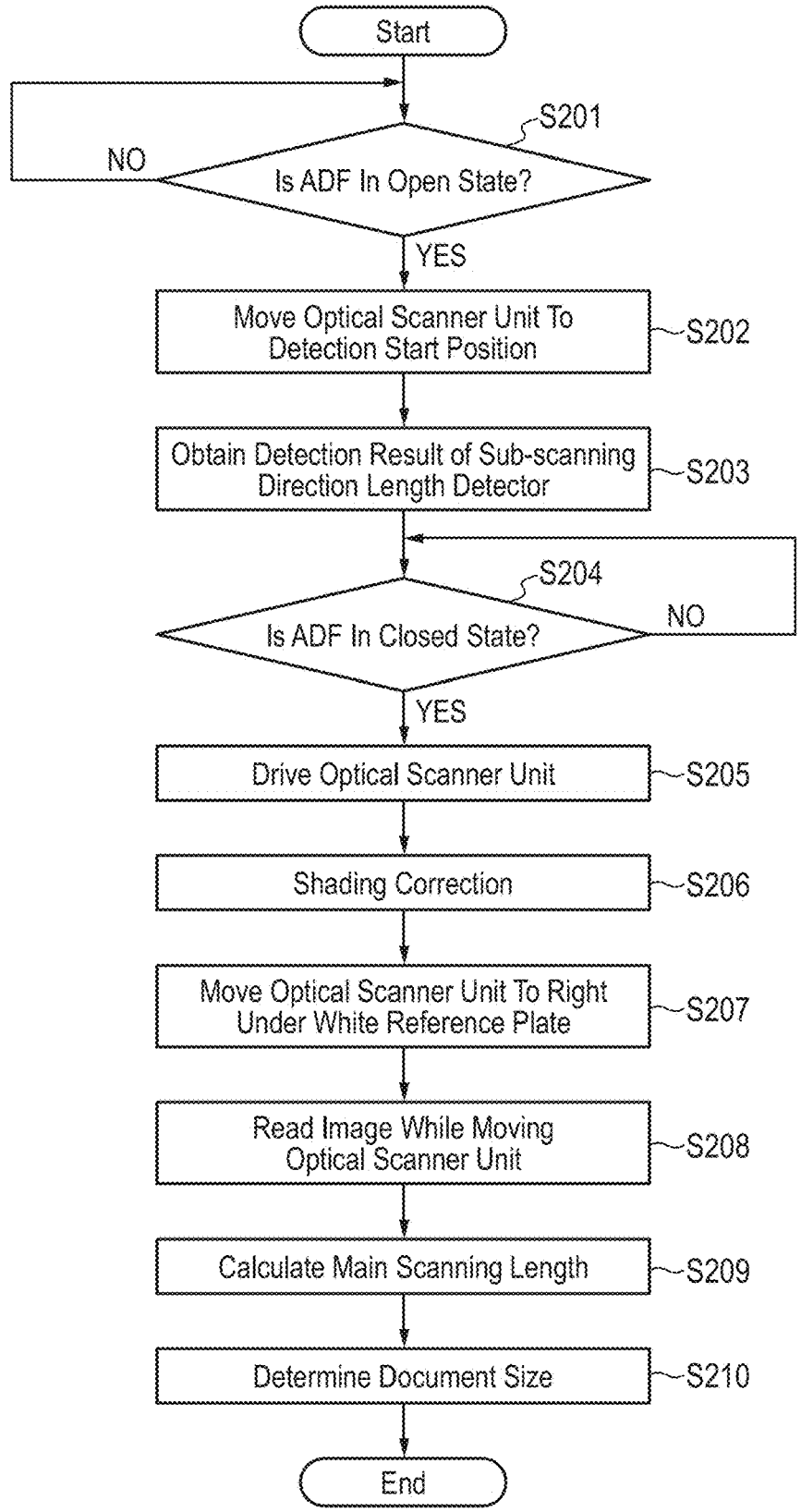
FIG. 9 is a flowchart for illustrating a document size detection processing.

When the user closes the ADF 100 after the user opens the ADF 100 and places a document S on the document platen glass 209, the document size is detected. FIG. 9 is a flowchart illustrating a document size detection processing performed by the CPU 801. The CPU 801 functions as a document size determiner that determines the size of the document from the document image subjected to the shading correction.

The CPU 801 does not start the document size detection processing until the ADF 100 is determined to be in the open state based on the detection result of the opening and closing sensor (open-close detector) 211 (that is, as far as NO in S201). If the ADF 100 is in the open state (that is, if YES in S201), the CPU 801 determines that the user will place a document S on the document platen glass 209 to perform the image reading processing, and starts preparing for the document size detection processing. Specifically, the CPU 801 makes the optical motor 822 move the optical scanner unit 202 to the document size detection starting position shown in FIG. 5B (S202). The CPU 801 obtains the detection result of the sub-scanning direction length detector 212 and stores the detection result in the RAM 803 (S203). Since the detection result of the sub-scanning direction length detector 212 is obtained when the ADF 100 is in the open state, the possibility can be reduced that the white back side of the ADF 100 is erroneously detected as the document S. The sub-scanning direction length detector 212 does not use visible light for document detection.

After that, the CPU 801 waits until the ADF 100 is determined to be in the closed state based on the detection result of the opening and closing sensor 211 (that is, as far as NO in S204). While S201 to S204 are being performed, the user opens the ADF 100, places the document S on the document platen glass 209, and closes the ADF 100. Once the ADF 100 is closed (if YES in S204), the CPU 801 drives the optical scanner unit 202 (S205). Thus, the image reading sensor 208 and the LED 203 start being driven. The CPU 801 performs the shading correction using the shading data previously set in the image processing portion 833 (S206). The shading data previously set in the image processing portion 833 is data set in the initial adjustment processing described above, in a shading data setting processing before and after a job described later, or in a shading data update processing. That is, the shading data previously set in the image processing portion 833 is set at any of the following timings: opening and closing of the SDF 100, immediately after the power on and the initial adjustment, within a predetermined time after completion of a job, and after a lapse of the predetermined time since completion of a job. The shading correction adjusts the light intensity of the LED 203 for each pixel in the main scanning direction.

After the shading correction, the CPU 801 drives the optical motor 822 to move the optical scanner unit 202 from the document size detection starting position to right under the white reference plate 210 shown in FIG. 5A (S207). The CPU 801 makes the optical scanner unit 202 read the document image while the optical scanner unit 202 is being moved (S208). The CPU 801 detects an edge of the document image from the read result of the image processing portion 833, and calculates the main scanning direction length of the document from the abutment position 214 to the document edge (S209).

Figure 10:
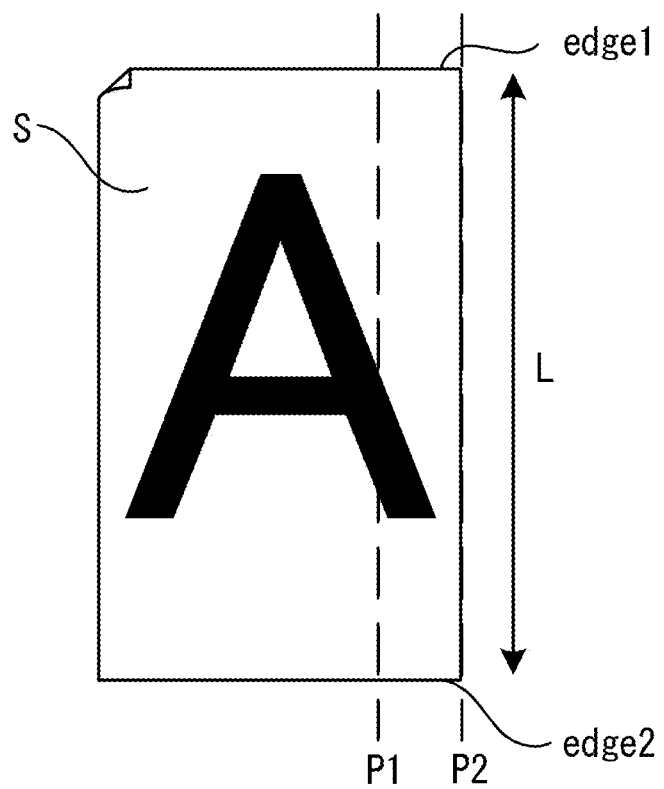
FIG. 10 is a diagram for illustrating a processing of calculating a main scanning direction size of a document.

FIG. 10 is a diagram for illustrating a main scanning direction size calculation processing. The document S is placed on the document platen glass 209 in such a manner that the character "A" can be read. The optical scanner unit 202 reads the document image while moving from the document size detection starting position to right under the white reference plate 210, so that a range of the document S from a position P1 to a position P2 is read (the range is referred to as a read range). In the read range, the CPU 801 detects black edges that are continuous in the direction of movement of the optical scanner unit 202, and selects two black edges distant from each other in the main scanning direction to extract edges "edge1" and "edge2". The edges "edge1" and "edge2" can be extracted because a shadow at the edge of the document S is read as a black edge in the image reading. The CPU 801 can obtain a main scanning direction length L of the document S by calculating the distance between the edges "edge1" and "edge2".

In the processing of detecting a shadow of the document S as a black edge, optical characteristics of the optical scanner unit 202 need to be corrected to read the document image without streaks. To this end, the CPU 801 makes the optical scanner unit 202 read the document under predetermined reading conditions when the optical scanner unit 202 is moved from the document size detection starting position to right under the white reference plate 210 before calculation of the main scanning direction length. The predetermined reading conditions are a resolution of 600 dpi, color reading and fixed reading, for example. In the document size detection, a reading processing is performed under these reading conditions. Then, the shading correction is performed on the image data on the read document image using the shading data corresponding to the predetermined reading conditions previously set in the image processing portion 833. The previously set shading data allows more precise black edge detection compared with the case where the shading correction is not performed. Thus, the detection precision of the main scanning direction length L of the document S is improved.

Figure 11:
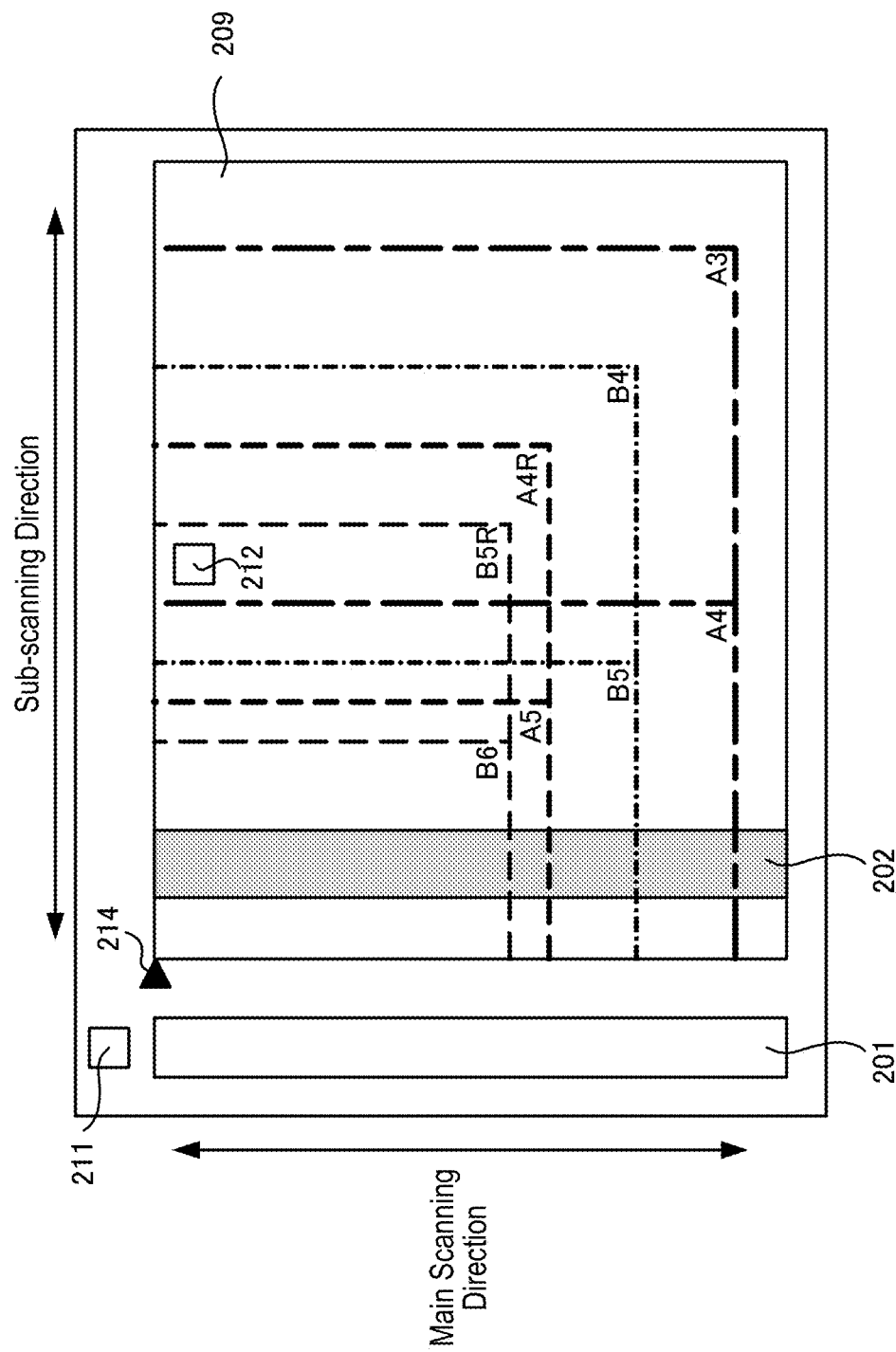
FIG. 11 is a diagram for illustrating how documents of different sizes are placed on a document platen glass.

The CPU 801 determines the document size based on the detection result of the sub-scanning direction length detector 212 stored in the RAM 803 in S203 and the main scanning direction length L calculated in S209 (S210). FIG. 11 is a diagram for illustrating how documents S of different sizes are placed on the document platen glass 209. Before determining the document size, the CPU 801 determines to which of B6/B5R, A5/A4R, B5/B4 and A4/A3 the main scanning direction length L most closely approximates. The CPU 801 then determines whether the placed document S is longer in the sub-scanning direction based on the detection result of the sub-scanning direction length detector 212 or not. In this way, the document size is uniquely determined. Note that, although the size that the main scanning direction length L most closely approximates is searched for in this example, a nonstandard size can also be detected. For example, if the main scanning direction length L calculated in S209 does not fall within the range of ±10 [mm] of a standard size, the CPU 801 determines that the document S is of a nonstandard size.

(Shading Data Setting Before and after Job)

Figure 12:
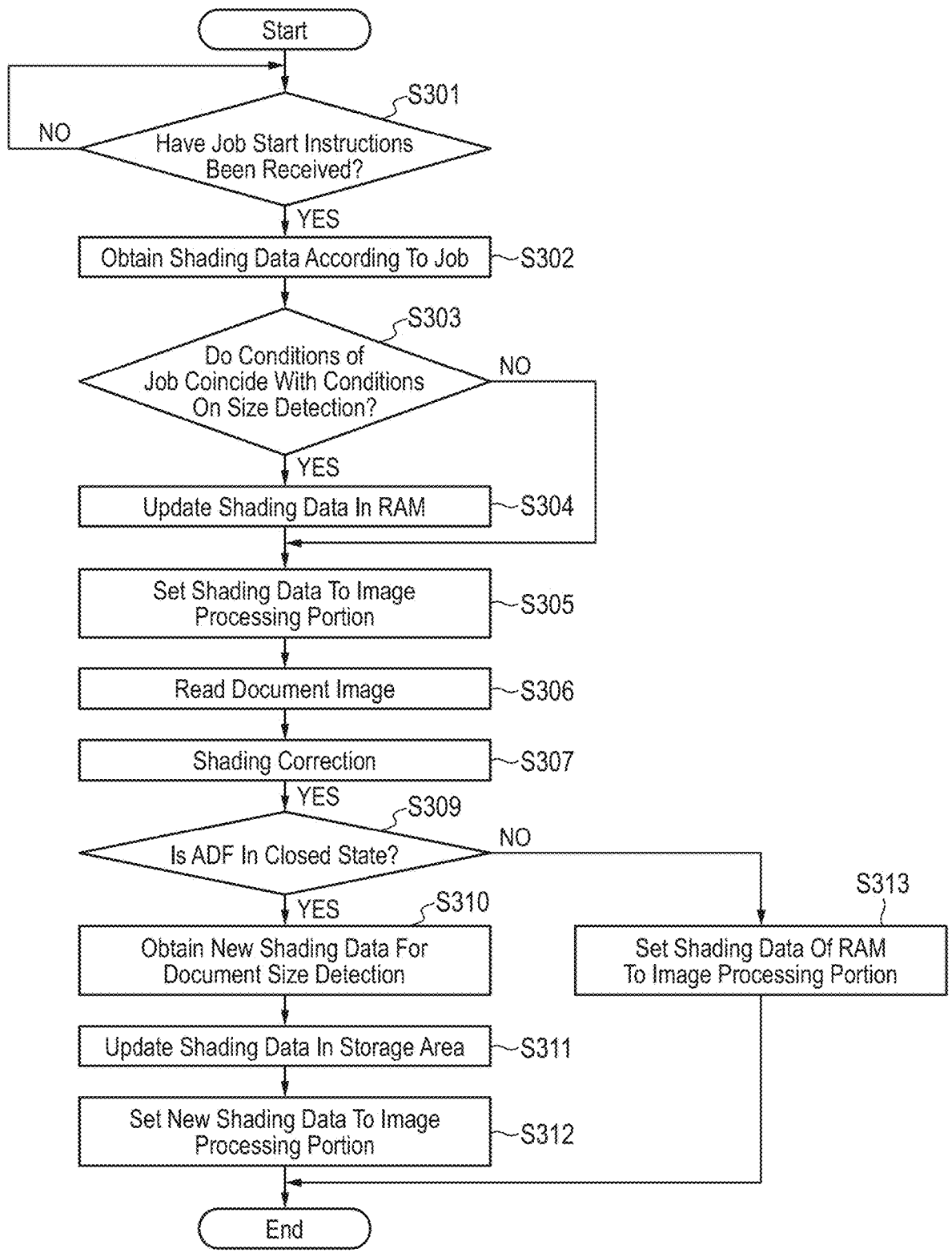
FIG. 12 is a flowchart for illustrating a shading data setting processing before and after a job is performed.

FIG. 12 is a flowchart illustrating a shading data setting processing before and after a job is performed. The processing is started by the user instructing to perform the image reading processing on the operation display portion 904. The instruction to perform the image reading processing is input to the CPU 901 of the second controller 300 from the operation display portion 904. In response to this instruction, the CPU 901 transmits a job start instruction for the image reading processing to the CPU 801 of the first controller 310.

The CPU 801 of the first controller 310 waits for the job start instruction before the image reading processing is performed (that is, as far as NO in S301). Upon receiving the job start instruction from the CPU 901 (that is, if YES in S301), the CPU 801 obtains the shading data corresponding to the reading conditions specified by the job (S302). The reading conditions include the reading color mode, the resolution and whether the fixed reading or flow reading is performed, for example. In S302, the same processing as S102 to S105 in FIG. 4 is performed to obtain the shading data. In S302, the white reference plate is read under the reading conditions specified by the job, although the white reference plate is read under predetermined reading conditions in S102 to 205 in FIG. 4. The obtained shading data is shading data for image reading, not for document size detection. The shading data for image reading is previously stored in the nonvolatile memory 805 for each job.

The CPU 801 checks whether the reading conditions specified by the job agree with the reading conditions (the color reading mode, the resolution of 600 dpi and the fixed reading) in the document size detection described above (S303). If the reading conditions specified by the job agree with the reading conditions in the document size detection (if YES in S303), the CPU 801 updates the shading data in the shading data storage area in the RAM 803 as in S106 (S304).

After the shading data is copied, or if the reading conditions specified by the job do not agree with the reading conditions in the document size detection (if NO in S303), the CPU 801 sets the shading data in the image processing portion 833 (S305). The CPU 801 makes the optical scanner unit 202 read the document image by one of the fixed reading and the flow reading based on the reading conditions specified by the job (S306). The image processing portion 833 performs the shading correction on the image data on the document image using the set shading data (S307).

After reading of the document image is completed, the CPU 801 determines whether the ADF 100 is in the open state or the closed state based on the detection result of the opening and closing sensor 211 (S309). If the ADF 100 is in the closed state (if YES in S309), the CPU 801 obtains new shading data for document size detection under the reading conditions in the document size detection by the optical scanner unit 202 (S301). That is, the CPU 801 performs the processing shown in FIG. 7 under the reading conditions of the color reading mode, the resolution of 600 dpi and the fixed reading. The CPU 801 updates the shading data in the shading data storage area in the RAM (storage portion) 803 by using the obtained new shading data (S311). The CPU 801 as a shading data obtaining device sets the obtained new shading data in the image processing portion 833 for the next document size detection processing (S312). If the ADF 100 is in the open state (if NO in S309), the CPU 801 obtains the shading data from the shading data storage area in the RAM 803 and sets the shading data in the image processing portion 833 for the next document size detection processing (S313).

Then, the shading data setting for the next document size detection processing ends. Since the shading data is set before the document size detection processing is performed, the image reading apparatus 1000 can detect the document size from the document image without obtaining new shading data when the user opens or closes the ADF 100.

(Regular Update of Shading Data)

Figure 13:
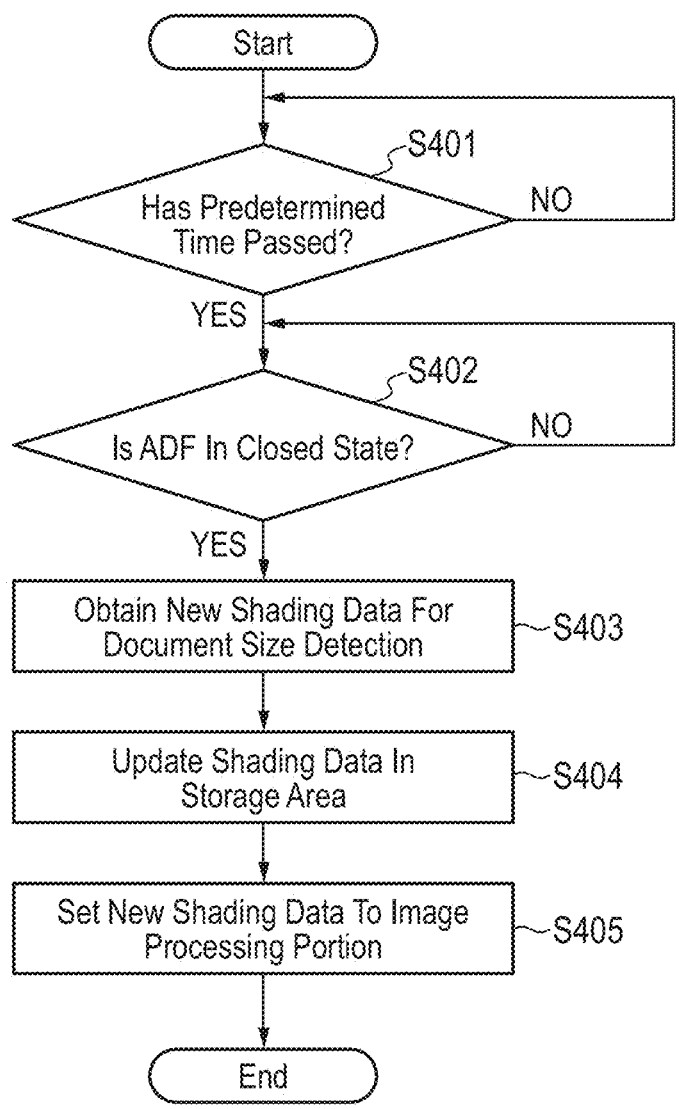
FIG. 13 is a flowchart for illustrating a shading data update processing.

If the image reading processing is not performed for a long time after the shading data is set, the environmental conditions including temperature and humidity of the image reading apparatus 1000 may change. Such a change of the environmental conditions results in a change of the image reading characteristics. The change of the image reading characteristics can make the shading data obtained in S310 described above inappropriate as correction data for the document size detection. To avoid this, while no instruction to perform the image reading processing is issued, the shading data is desirably regularly updated at predetermined time intervals. FIG. 13 is a flowchart illustrating a shading data update processing.

Using a timer, the CPU 801 determines whether a predetermined time has passed without any job start instruction for the image reading processing being received from the CPU 901 of the second controller 300 (S401). If the predetermined time has passed (if YES in S401), the CPU 801 determines the open/closed state of the ADF 100 based on the detection result of the opening and closing sensor 211 (S402). If the ADF 100 is in the open state (if NO in S402), the CPU 801 repeats S402 until the ADF 100 is closed.

If the ADF 100 is in the closed state (if YES in S402), the CPU 801 performs the same processing as S310 to S312 in FIG. 12. In this processing, the CPU 801 obtains shading data, uses the obtained shading data to update the shading data in the shading data storage area in the RAM 803, and sets the updated shading data in the image processing portion 833 (S403 to S405).

Then, setting of appropriate shading data for the next document size detection processing is completed. Since the shading data is set before the document size detection processing is performed, the document size can be detected form the document image without obtaining shading data when the user opens or closes the ADF 100. Since the shading data is obtained when the ADF 100 is in the closed state, the user does not suffer from the bright light when the shading data is obtained.

(Modification 1 of Shading Data Setting Processing Before and after Job)

Figure 14:
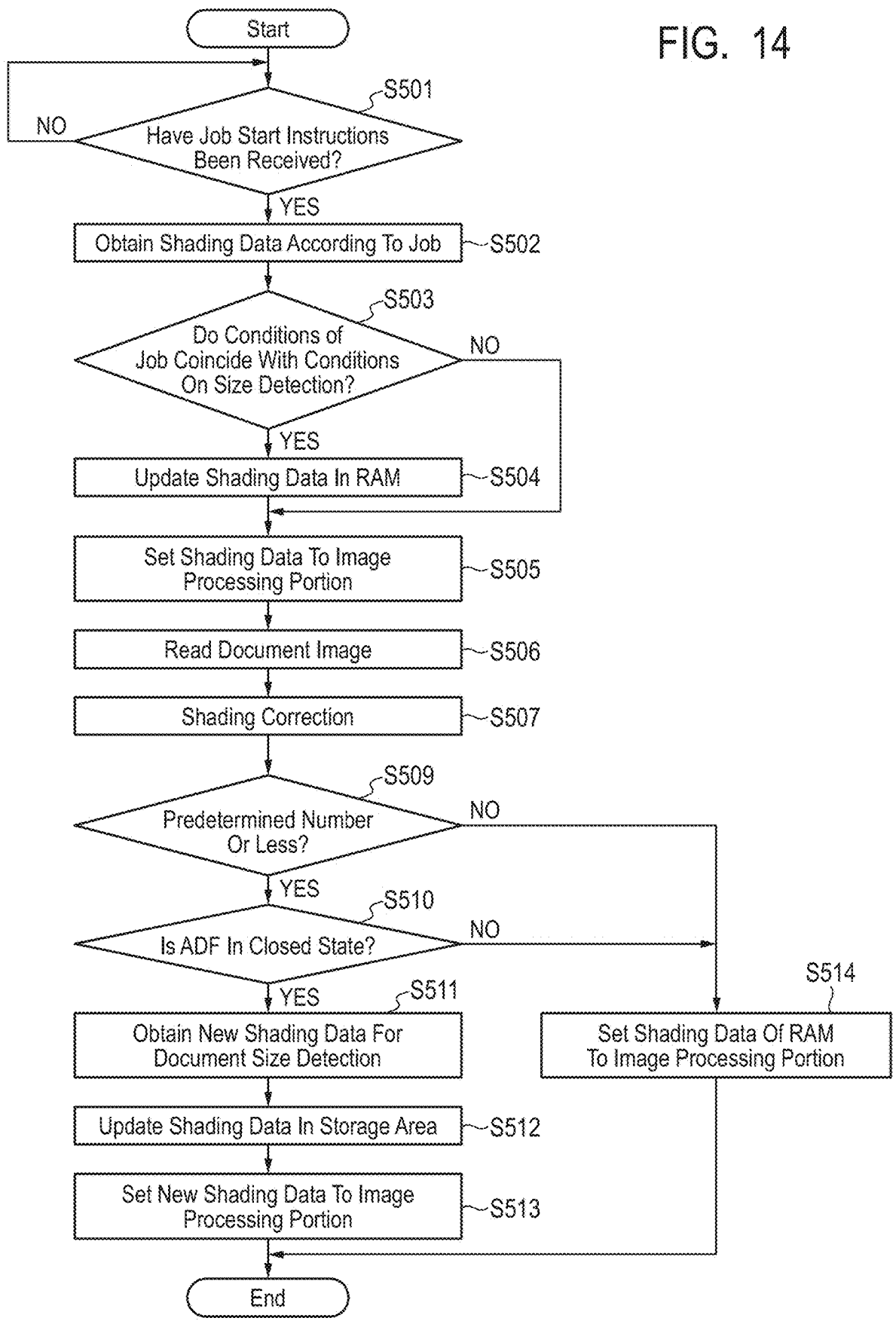
FIG. 14 is a flowchart for illustrating a modification of the shading data setting processing.

FIG. 14 is a flowchart illustrating a modification of the shading data setting processing before and after a job. As with the processing shown in FIG. 12, this processing is started by the user instructing to perform the image reading processing on the operation display portion 904. The instruction to perform the image reading processing is input to the CPU 901 of the second controller 300 from the operation display portion 904. In response to this instruction, the CPU 901 transmits a job start instruction for the image reading processing to the CPU 801 of the first controller 310.

Upon receiving the job start instruction from the CPU 901, the CPU 801 of the first controller 310 reads the document image in the same processing as S301 to S307 in FIG. 12 (S501 to S507). After completion of the reading of the document image, the CPU 801 performs the job to determine whether or not the number of successive document images read using the ADF 100 is equal to or smaller than a predetermined number (S509). As the number of documents S read increases, the temperature of the image reading sensor 208 and the LED 203 increases. The increase in temperature causes a change of the image reading characteristics. Therefore, the CPU 801 determines whether to perform the shading data setting processing depending on the number of document images read. It is supposed that there is often a long time before the next document size detection processing. Thus, the CPU 801 avoids using shading data after reading of a large number of document images, which can be different in image reading characteristics from the shading data obtained when the document size detection processing is performed.

If the number of documents read is equal to or smaller than the predetermined number (if YES in S509), the CPU 801 sets the shading data in the same processing as S309 to S313 in FIG. 12 (S510 to S514). If the number of documents read is larger than the predetermined number (if NO in S509), the CPU 801 obtains the shading data from the shading data storage area in the RAM 803 and sets the shading data in the image processing portion 833 for the document size detection processing (S514).

Then, setting of appropriate shading data for the next document size detection processing less affected by an environmental change such as an increase in temperature is completed. Since the shading data is set before the document size detection processing is performed, the image reading apparatus 1000 can detect the document size from the document image without obtaining new shading data when the user opens or closes the ADF 100. Since the shading data is obtained when the ADF 100 is in the closed state, the user does not suffer from the bright light when the shading data is obtained. This processing is effective when the image reading apparatus 1000 does not include a heat radiator member such as a fan or when the document size is detected immediately after images on a large number of documents are read.

(Modification 2 of Shading Data Setting Processing)

Figure 15:
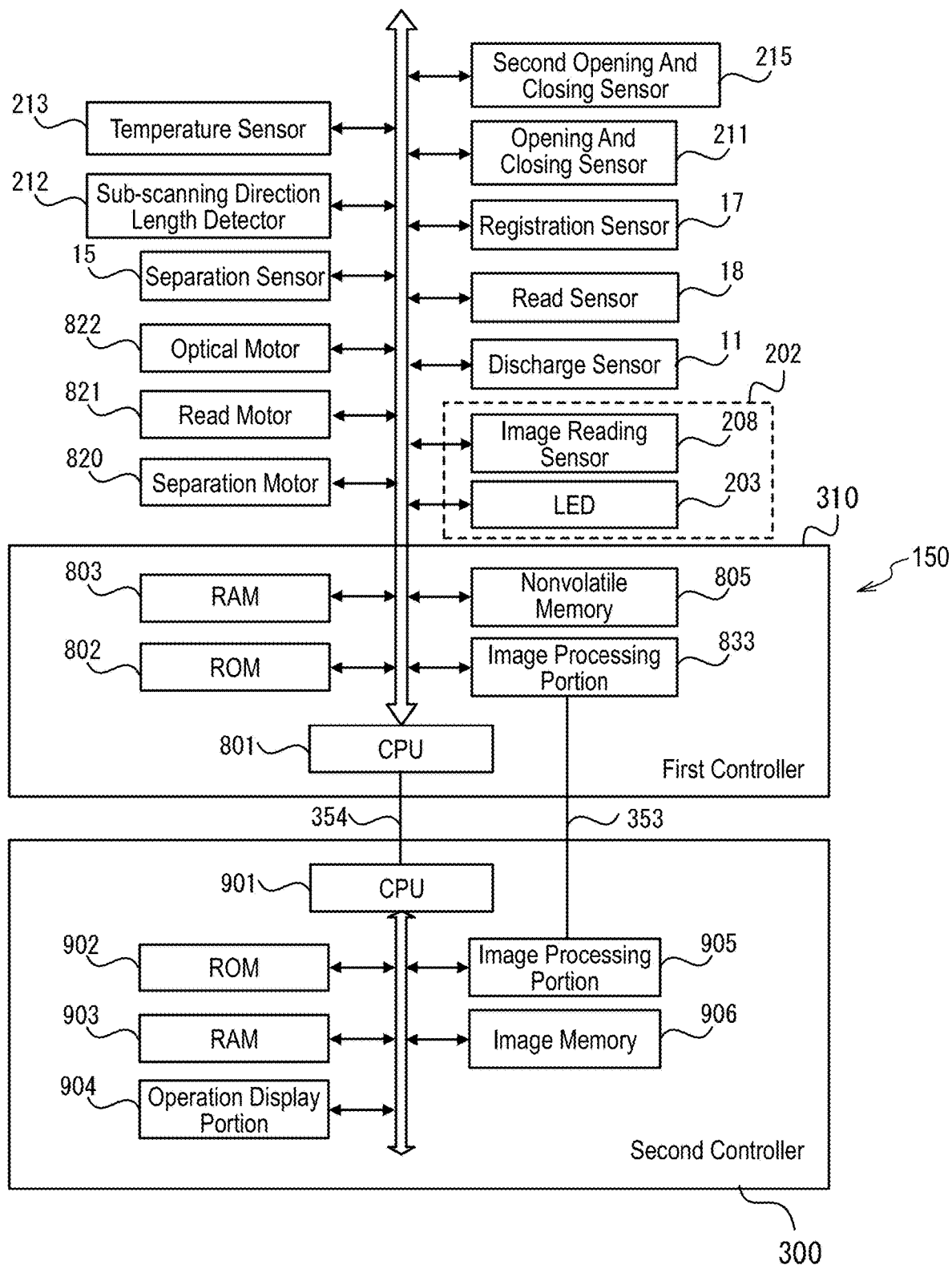
FIG. 15 is a diagram illustrating a configuration of a control unit.

FIG. 15 is a diagram illustrating a configuration of the control unit in the case where the image reading apparatus 1000 includes a temperature sensor (temperature detector) 213 and a second opening and closing sensor 215.

The temperature sensor 213 is incorporated in the optical scanner unit 202 and detects the temperature of the optical scanner unit 202. For example, the temperature sensor 213 is placed on a substrate on which the components of the optical scanner unit 202 are mounted. The CPU 801 determines the current temperature of the optical scanner unit 202 based on the detection result of the temperature sensor 213.

Figure 16:
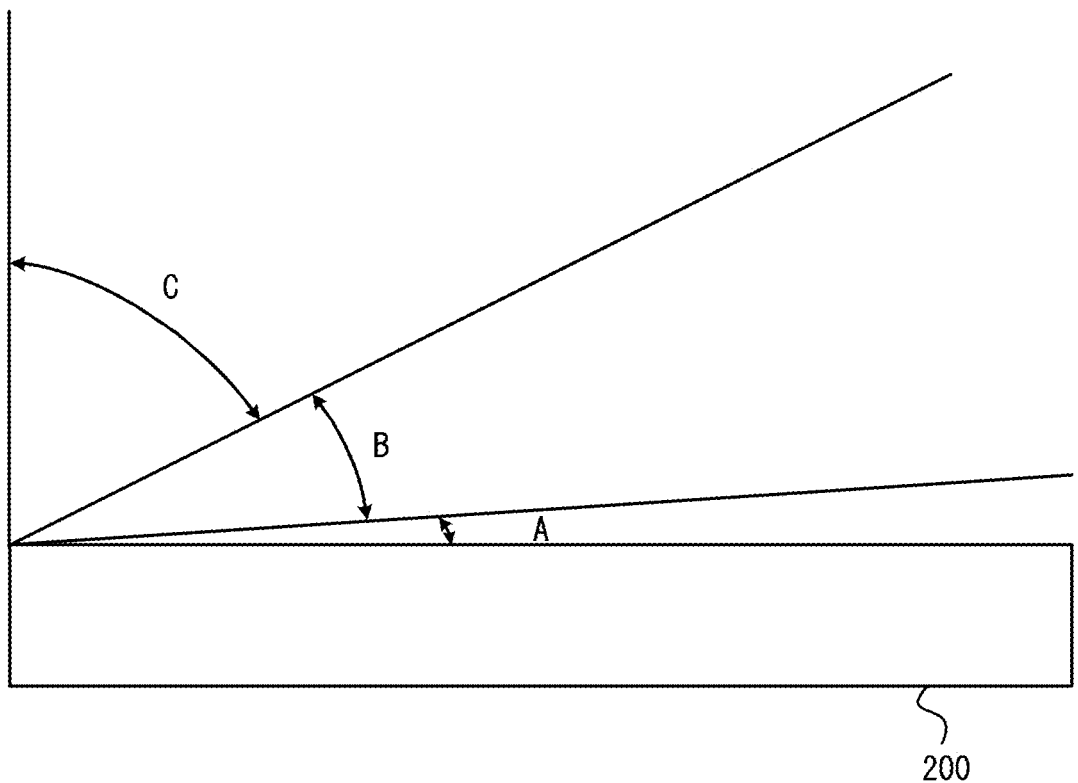
FIG. 16 is a diagram for illustrating an open/closed state of the ADF.

The second opening and closing sensor (second opening and closing detector) 215 has the same configuration as the opening and closing sensor 211 and detects the open/closed angle of the ADF 100 with respect to the image reading portion 200. The second opening and closing sensor 215 detects that the ADF 100 is in the open state when the ADF 100 is open with respect to the image reading portion 200 (document platen glass 209) to an angle of 10° or larger. FIG. 16 is a diagram for illustrating the open/closed state of the ADF 100. The CPU 801 can detect three open/closed states of the ADF 100 according to the detection results from the opening and closing sensor 211 and the second opening and closing sensor 215. In the illustrated example, the CPU 801 detects an open/closed state A with the ADF 100 angled at 0° to 1°, an open/closed state A with the ADF 100 angled at 1° to 10° and an open/closed state A with the ADF 100 angled at 10° to 90°, which is the maximum open/closed angle. In the following description, the open/closed states A and B are assumed to be a closed state.

Figure 17:
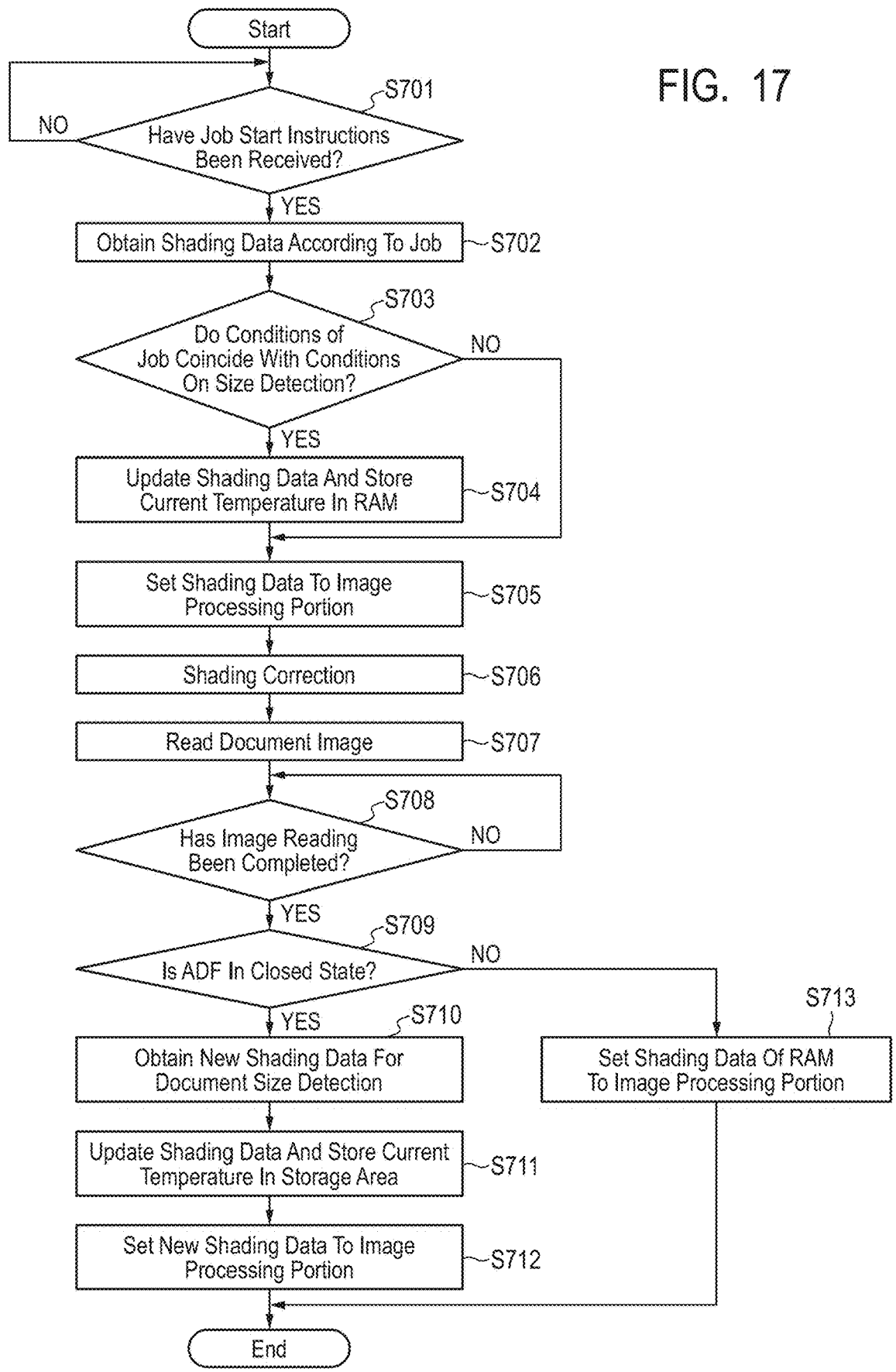
FIG. 17 is a flowchart for illustrating a modification of the shading data setting processing.

FIG. 17 is a flowchart illustrating a modification of the shading data setting processing before and after a job is performed. As with the processing in FIG. 12, this processing is started by the user instructing to perform the image reading processing on the operation display portion 904. The instruction to perform the image reading processing is input to the CPU 901 of the second controller 300 from the operation display portion 904. In response to this instruction, the CPU 901 transmits a job start instruction for the image reading processing to the CPU 801 of the first controller 310.

Upon receiving the job start instruction from the CPU 901, the CPU 801 of the first controller 310 performs the same processing as S301 to S303 in FIG. 12 (S701 to S707). If conditions of the job coincide with the reading conditions in the document size detection (if YES in S703), the CPU 801 copies the shading data obtained in S702 into the shading data storage area in the RAM 803. The CPU 801 further stores the current temperature in the optical scanner unit 202 obtained from the detection result of the temperature sensor 213 in the RAM (storage portion) 803 (S704).

After that, the CPU 801 performs the same processing as S305 to S310 in FIG. 12 (S705 to S710). In the processing of detecting the open/closed state of the ADF 100 in S709, the CPU 801 precisely determines the closed state of the ADF 100 based on the detection results from the opening and closing sensor 211 and the second opening and closing sensor 215. The CPU 801 copies the new shading data obtained in S701 into the shading data storage area in the RAM 803. The CPU 801 further stores the current temperature of the optical scanner unit 202 obtained from the detection result of the temperature sensor 213 in the RAM 803 (S711). After that, the CPU 801 performs the same processing as S312 in FIG. 12 (S712). If the ADF is in the closed state (if NO in S709), the CPU 801 performs the same processing as S313 in FIG. 12 (S713).

Figure 18:
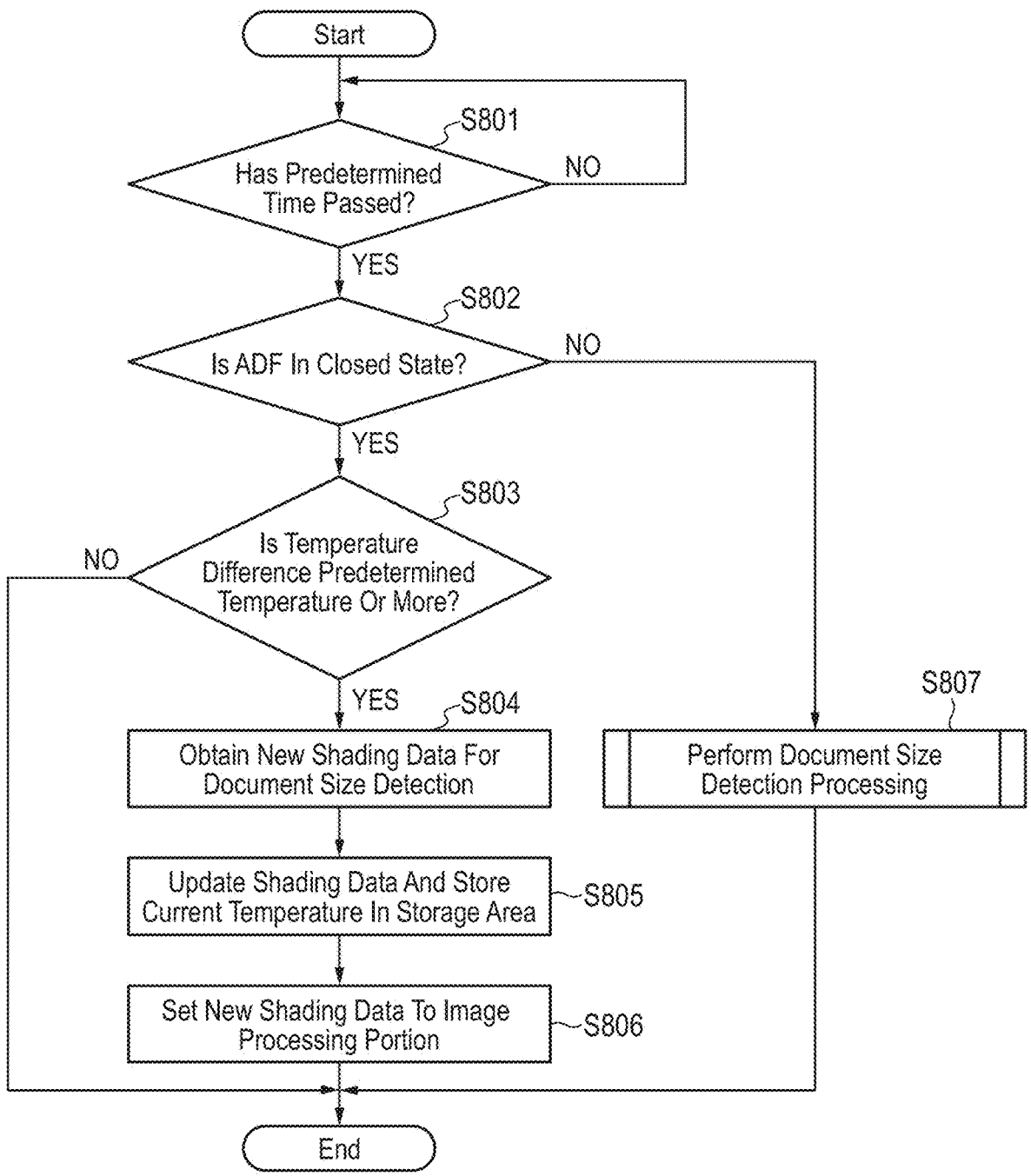
FIG. 18 is a flowchart for illustrating a shading data update processing.

By the processing described above, the shading data set in the image processing portion 833 can be associated with the temperature in the optical scanner unit 202, and therefore, the shading data can be updated according to a change in temperature. FIG. 18 is a flowchart illustrating a shading data update processing according to temperature.

Using a timer, the CPU 801 determines whether a predetermined time has passed without any job start instruction for the image reading processing being received from the CPU 901 of the second controller 300 (S801). If the predetermined time has passed (if YES in S801), the CPU 801 determines the open/closed state of the ADF 100 based on the detection results from the opening and closing sensor 211 and the second opening and closing sensor 215 (S802). If the ADF 100 is in the open state (if NO in S802), the CPU 801 performs the processing in FIG. 9 (S807). That is, the CPU 801 obtains the detection result of the sub-scanning direction length detector 212 until the ADF 100 is closed.

If the ADF 100 is in the closed state (if YES in S802), the CPU 801 determines whether or not the difference between the current temperature in the optical scanner unit 202 and the temperature at the time when the previous shading data is obtained is equal to or larger than a predetermined temperature (S803). In this step, the CPU 801 compares, with a predetermined temperature, the difference between the current temperature in the optical scanner unit 202 determined from the detection result of the temperature sensor 213 and the temperature at the time when the previous shading data in the RAM 803 is obtained. The predetermined temperature is 2[° C.], for example.

If the temperature difference is equal to or larger than the predetermined temperature (if YES in S803), the CPU 801 determines that the optical characteristics of the optical scanner unit 202 have changed and the shading data needs to be updated. The CPU 801 performs the same processing as S710 to S712 in FIG. 17. In this way, the CPU 801 obtains the shading data and copies the obtained shading data and the current temperature in the optical scanner unit 202 into the shading data storage area in the RAM 803. The CPU 801 further sets the shading data in the image processing portion 833 (S804 to S806). If the temperature difference is smaller than the predetermined temperature (if NO in S803), the CPU 801 determines that the optical characteristics of the optical scanner unit 202 has not substantially changed, and thus ends the processing without updating the shading data.

By the processing described above, appropriate shading data for the next document size detection processing can be efficiently set according to a change of the optical characteristics with temperature. Determination of whether to update the shading data is made at regular time intervals by polling. However, the determination is made in other ways. For example, the image reading apparatus 1000 includes an electrical circuit that interrupts the CPU 801 when a certain level of temperature change has occurred. When interrupted, the CPU 801 can determine the open/closed state of the ADF 100 and determine whether to update the shading data. With such a configuration, the shading data is frequently updated when the temperature rapidly changes, and the shading data is less frequently updated when the temperature is steady.

In the example described above, the open/closed state of the ADF 100 is detected using one or two sensors. Alternatively, the open/closed state of the ADF 100 can be detected in other ways as far as the ADF 100 is in the open/closed state in which the user does not suffer from the bright light. For example, three or more opening and closing sensors may be used to detect a plurality of open/closed states. Alternatively, an acceleration sensor that can steplessly detect the angle of the ADF 100 may be used to determine the open/closed state of the ADF 100 according to the detected angle. When a plurality of open/closed states is detected, the CPU 801 can determine the closed state of the ADF 100 according to the situation or closing speed and turn the LED 203 on. Specifically, the CPU 801 determines the speed of the ADF 100 being closed by the user from the detection result of the acceleration sensor. When the closing speed is high, the ADF 100 is closed to a larger extent until the LED 203 is turned on than when the closing speed is low, so that the CPU 801 can determine the closed state at a larger angle without making the user suffer from the bright light. The image reading apparatus 1000 may include a motion sensor. If the motion sensor reacts, there is someone around the image reading apparatus 1000, the CPU 801 determines the closed state of the ADF 100 at a smaller angle than when the motion sensor does not react, thereby reducing the possibility that the user suffers from the bright light.

The image reading apparatus 1000 according to this embodiment described above can appropriately detect the document size from the document image read by performing the shading correction, even when the ADF 100 is in the closed state. Therefore, the quantity of the light of the LED 203 that reaches the eyes of the user when the document size is detected can be reduced, and the possibility that the user suffers from the bright light. In addition, since the shading data is obtained when the ADF 100 is in the closed state, the user does not suffer from the bright light when the shading data is obtained.

According to this embodiment, the document size can be precisely detected even when the document platen cover is in the closed state.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-093677, filed May 10, 2017, which is hereby incorporated by reference herein in its entirety.

What is claimed is:

1. An image reading apparatus, comprising:
  a document platen on which a document to be read is placed;
  a reference member;
  a document platen cover, which is openably and closably attached to the document platen;
  a detector configured to detect an open state and a closed state of the document platen cover;
  a reader configured to read the document on the document platen while moving a reading position to output an image signal;
  an illuminator configured to illuminate the reading position;
  a memory configured to store shading correction data;
  an image processing portion configured to perform a shading correction on the image signal using the shading correction data; and
  a controller, which is configured to:
  perform an update processing in which the controller makes the reader read the reference member, performs a generation processing of generating shading correction data based on the image signal of the reference member output from the reader, and updates the shading correction data stored in the memory using the generated shading correction data, and
  perform a size determination processing in which the controller moves the reading position to a first position based on that a detection result of the detector is in a first state, then moves the reading position from the first position to a second position while lighting up the illuminator based on that the detection result of the detector is in a second state, and determines a size of the document based on a result of the shading correction performed on the image signal output from the reader while the reading position is being moved from the first position to the second position, wherein, when the document on the document platen is read, the controller performs the generation processing before the document is read, and the image processing portion performs the shading correction using the shading correction data generated before the document is read, and wherein, when the size determination processing is performed, the image processing portion performs the shading correction using the shading correction data stored in the memory, and the update processing is not performed during a period from a time when the detection result falls into the first state to a time when the reading position becomes the second position.

2. The image reading apparatus according to claim 1, further comprising a sensor configured to detect whether there is a document on the document platen, wherein the controller determines the size of the document based on a length of the document in a direction perpendicular to a direction of movement determined based on the image signal output from the reader while the reading position is being moved from the first position to the second position, and the detection result of the sensor.

3. The image reading apparatus according to claim 1, wherein the controller performs the generation processing and the update processing when the document platen cover is in the second state after reading of the document is completed.

4. An image reading apparatus comprising:
a document platen on which a document to be read is placed;
a document platen cover, which is openably and closably attached to the document platen;
an opening and closing detector configured to detect an open state and a closed state of the document platen cover;
a reader including a light source configured to emit light to the document placed on the document platen and a light receiving portion configured to receive reflection light from the document, the reader being configured to read an image of the document in a main scanning direction according to the reflection light received by the light receiving portion;
a document size determiner in which shading data for correcting a light intensity of the light emitted by the light source is set, the document size determiner configured to determine a size of the document from the image of the document read by the reader subjected to a shading correction using the shading data when the opening and closing detector detects the closed state of the document platen cover;
a shading data obtaining device configured to obtain new shading data and set the new shading data in the document size determiner when the opening and closing detector detects the closed state of the document platen cover after the reader reads the image of the document; and
a feeder configured to successively feed a plurality of documents to a reading position of the reader, wherein the shading data obtaining device does not obtain the new shading data when a number of documents successively read by the reader is equal to or smaller than a predetermined number.

5. An image reading apparatus comprising:
a document platen on which a document to be read is placed;
a document platen cover, which is openably and closably attached to the document platen;
an opening and closing detector configured to detect an open state and a closed state of the document platen cover;
a reader including a light source configured to emit light to the document placed on the document platen and a light receiving portion configured to receive reflection light from the document, the reader being configured to read an image of the document in a main scanning direction according to the reflection light received by the light receiving portion;
a document size determiner in which shading data for correcting a light intensity of the light emitted by the light source is set, the document size determiner configured to determine a size of the document from the image of the document read by the reader subjected to a shading correction using the shading data when the opening and closing detector detects the closed state of the document platen cover;
a shading data obtaining device configured to obtain new shading data and set the new shading data in the document size determiner when the opening and closing detector detects the closed state of the document platen cover after the reader reads the image of the document; and
a temperature detector configured to detect a temperature of the reader, wherein the shading data obtaining device stores the temperature at a time when a previous shading data is obtained in the storage portion, and obtains the new shading data when a temperature difference between the temperature at a time when the opening and closing detector detects the closed state of the document platen cover and the temperature stored in the storage portion is equal to or larger than a predetermined temperature.

6. An image reading apparatus comprising:
a document platen on which a document to be read is placed;
a document platen cover, which is openably and closably attached to the document platen;
an opening and closing detector configured to detect an open state and a closed state of the document platen cover;
a reader including a light source configured to emit light to the document placed on the document platen and a light receiving portion configured to receive reflection light from the document, the reader being configured to read an image of the document in a main scanning direction according to the reflection light received by the light receiving portion;
a document size determiner in which shading data for correcting a light intensity of the light emitted by the light source is set, the document size determiner configured to determine a size of the document from the image of the document read by the reader subjected to a shading correction using the shading data when the opening and closing detector detects the closed state of the document platen cover;

a shading data obtaining device configured to obtain new shading data and set the new shading data in the document size determiner when the opening and closing detector detects the closed state of the document platen cover after the reader reads the image of the document; and a sub-scanning direction length detector provided at a predetermined distance, in a sub-scanning direction perpendicular to the main scanning direction, away from a reference position for the document to be placed on the document platen, the sub-scanning direction length detector being configured to detect a presence or absence of the document placed on the document platen, wherein the document size determiner determines the size of the document based on a detection result of the sub-scanning direction length detector and the size of the document in the main scanning direction.

* * * * *